INVENTOR
R. L. MILLER
BY *A. H. MacPherson*
ATTORNEY (PERIOD TRANSLATOR)

(PEAK DETECTOR)

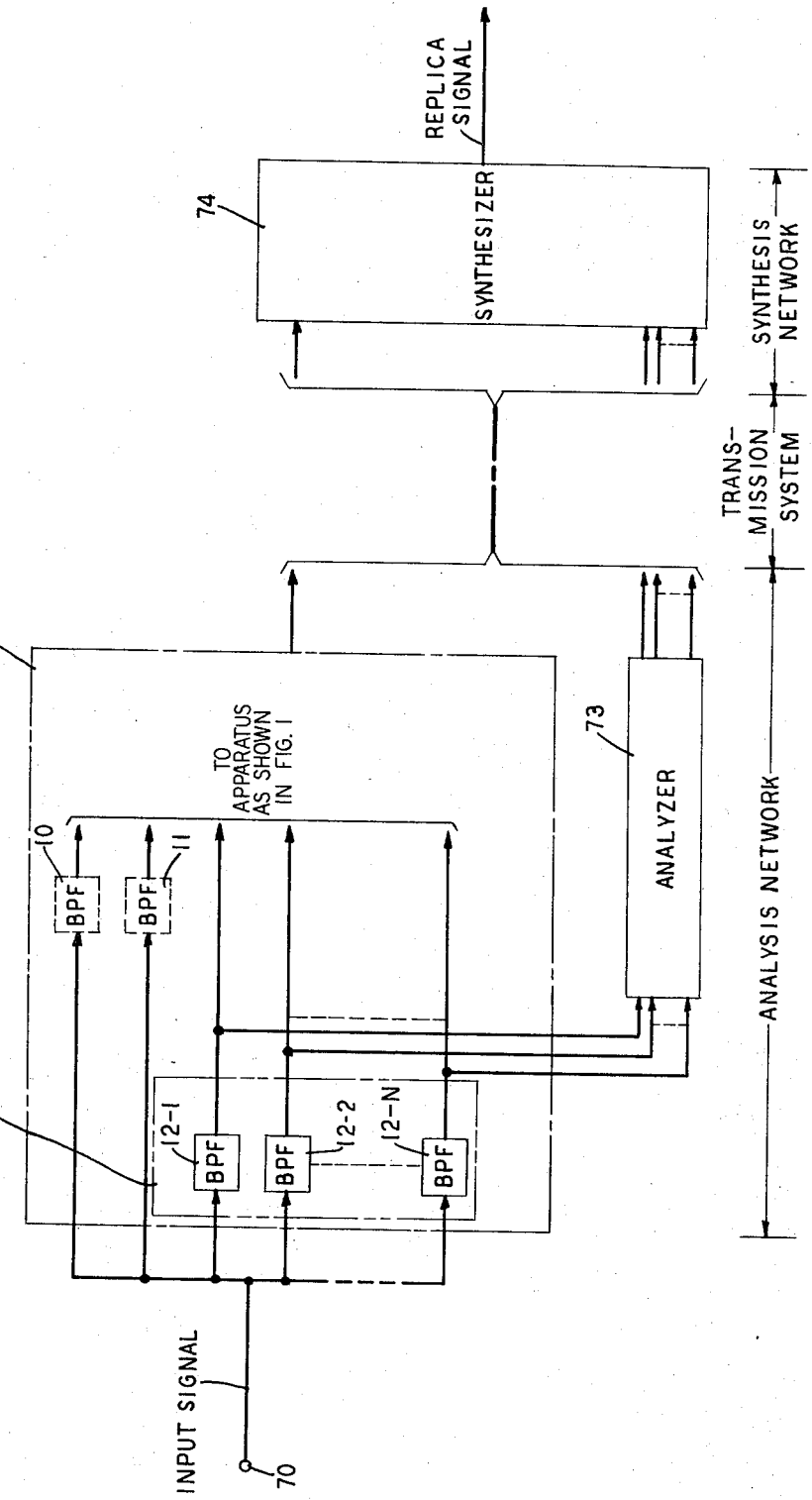

United States Patent Office 3,535,454
Patented Oct. 20, 1970

3,535,454
FUNDAMENTAL FREQUENCY DETECTOR
Ralph L. Miller, Chatham, N.J., assignor to Bell Telephone Laboratories, Incorporated, Murray Hill, N.J., a corporation of New York
Filed Mar. 5, 1968, Ser. No. 710,595
Int. Cl. G10l 1/00
U.S. Cl. 179—1
12 Claims

ABSTRACT OF THE DISCLOSURE

The fundamental period of a complex periodic signal is determined by dividing the periodic signal into subsignals and then summing selected pulse sequences, each sequence possessing a pulse spacing inversely proportional to the frequency of one corresponding subsignal, to produce a so-called "period histogram." The time of occurrence of the first maximum amplitude pulse in this histogram corresponds to the fundamental period of the complex periodic signal. An estimate of the fundamental period of this signal, derived from its envelope, is used to enhance the reliability of the measured fundamental period. Linear weighting of the pulse sequences by the amplitudes of the subsignals from which they are derived further enhances the reliability of this fundamental period.

BACKGROUND OF THE INVENTION

This invention relates to signal processing and, in particular, to the generation of the fundamental frequency of a complex periodic signal whose fundamental component is missing.

In speech, the fundamental or pitch frequency and one or more of its harmonics are often either missing or obscured by noise. To produce a high quality replica of such speech from coded signals representing the speech, as, for example, in a vocoder, the fundamental frequency of the speech must be determined.

One method of determining the fundamental frequency of such a speech signal, exemplified by R. L. Miller Pat. No. 2,627,541, issued Feb. 3, 1953, involves tracking harmonics of the fundamental frequency. In this method, signals representative of the frequencies of these harmonics are each divided by an integer corresponding to the order of the harmonic. The resulting quotient signals, when equal to each other, represent the fundamental frequency. Unfortunately, in the absence of the fundamental, one does not always know the order of the harmonics present. Thus, often the quotient signals are not equal and the fundamental frequency remains undetermined.

Another technique for determining the fundamental frequency of a speech signal is disclosed in patent application Ser. No. 639,733, filed May 19, 1967, by M. R. Schroeder and assigned to Bell Telephone Laboratories, Incorporated, assignee of this application. Schroeder, in one embodiment, divides the complex periodic signal into subsignals occupying contiguous frequency bands. Then, periodically synchronized sequences of pulses are generated, each sequence possessing a pulse spacing inversely proportional to the frequency of a corresponding one of the subsignals. Summing the resulting pulse sequences produces a series of nonuniform amplitude pulses—a so-called "period histogram." The amplitude of each pulse in this series depends on the total number of simultaneously generated pulses in the pulse sequences. The time of occurrence of the first maximum amplitude histogram pulse corresponds to the period of the fundamental frequency.

Unfortunately, for certain types of speech sounds it is difficult to distinguish the first histogram pulse of maximum amplitude from other histogram pulses of slightly smaller amplitudes. Thus, it is difficult to obtain an accurate estimate of the fundamental frequency for all speech sounds.

SUMMARY OF THE INVENTION

According to this invention, this difficulty is substantially overcome by generating, in addition to a period histogram, a measure of the period of the envelope of the complex periodic signal. This measure, approximately equal to the fundamental period of the complex periodic signal, is then used to additionally weight the histogram pulse truly representing the period of the fundamental frequency. This additional weighting removes most of the uncertainty in the final estimate of the fundamental period.

Alternatively, knowledge of the approximate fundamental period makes it possible to provide a gating pulse of sufficient length to pass, most probably, the histogram pulse representing the period of the fundamental frequency, and no other histogram pulse.

Additionally, a technique for speeding up the rate at which histogram pulses representing the period of the fundamental frequency can be obtained further enhances the reliability of this invention's estimate of the fundamental period.

Finally, only those pulse sequences derived from subsignals above a threshold amplitude are combined to produce the period histogram. By weighting the pulse sequence derived from each subsignal by the amplitude of the subsignal before combining pulse sequences, a more accurate fundamental frequency is obtained than when logarithmic weighting, as taught by the prior art, is used.

Interestingly, the bandpass filters used to divide the complex periodic input signal into subsignals occupying continuous frequency bands are, in some cases, identical or substantially similar to the bandpass filters used to generate spectrum control signals in some types of bandwidth compression systems. By sharing the bandpass filters required by both the fundamental period detector of this invention and the appropriate bandwidth compression system, the complexity of a bandwidth compression system using the fundamental period detector of this invention is considerably reduced over what would normally be expected.

This invention will be more fully understood from the following detailed description taken together with the drawings.

BRIEF DESCRIPTION OF THE DRAWINGS

FIG. 8 is a schematic block diagram of a band compression system using the period detector of this invention.

DETAILED DESCRIPTION

Figure 1:
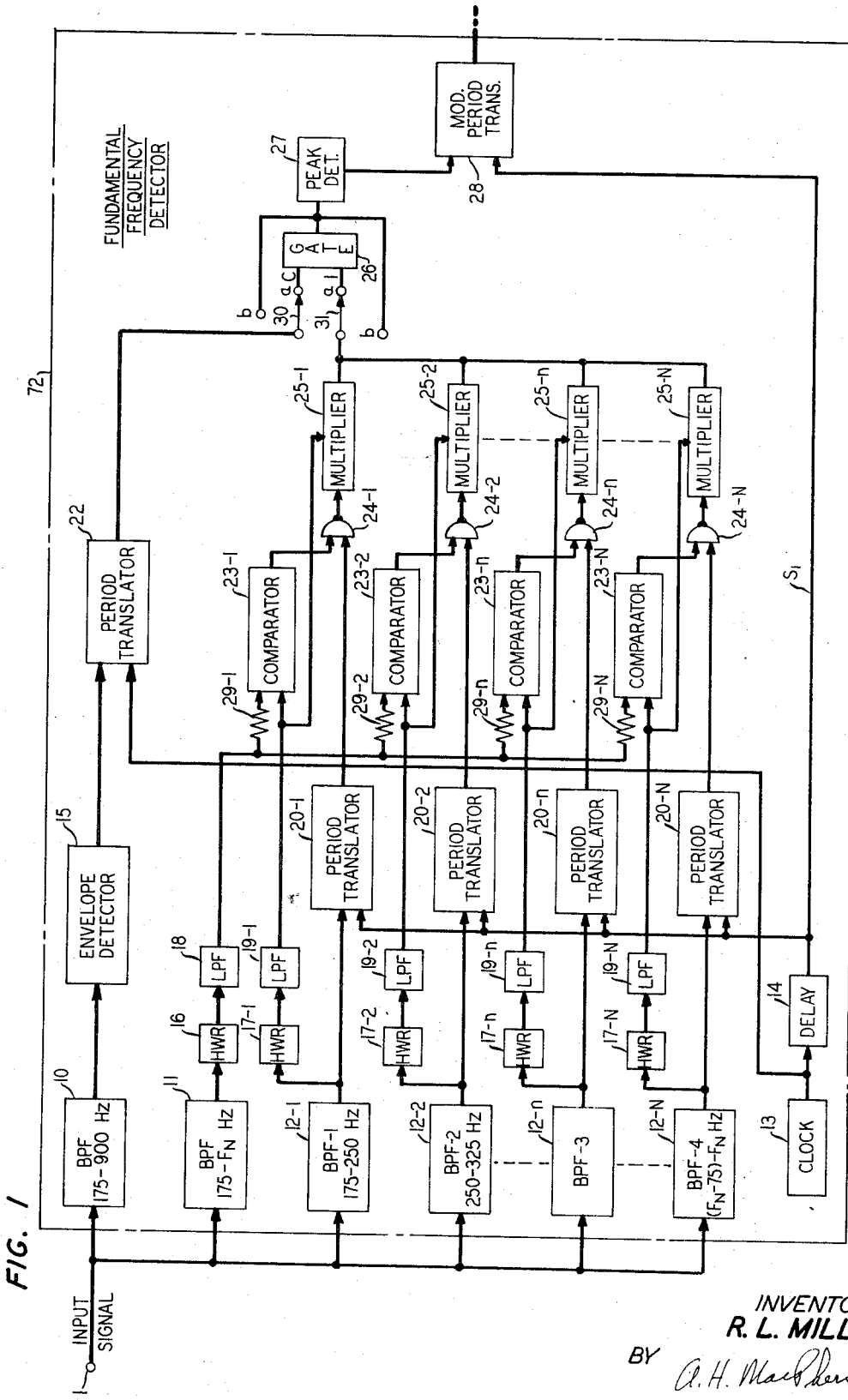
FIG. 1 is a schematic block diagram of a fundamental period detector constructed according to this invention.

FIG. 1 shows the fundamental period detector of this invention. A complex periodic acoustic signal such as speech, for example, is detected by transducer 1, of well known design, and converted by the transducer into an electrical signal. Bandpass filters 12–1 through 12–N divide this complex electrical signal into subsignals occupying adjacent, contiguous, frequency bands. The bandwidths of these filters might, for example, by 75 Hz. However, while ideally each filter passes only a single harmonic of the complex periodic signal being analyzed, as will be shown later these filters can each have somewhat broader bandwidths if, as in this invention, adequate filtering is provided at other places in the detector to remove the resulting beat frequency components.

The subsignal passed by each filter 12 is analyzed by a corresponding one of period translators 20–1 through 20–N. Each period translator 20 produces a pulse sequence at a rate proportional to the frequency of the output subsignal from its corresponding filter 12. Each pulse sequence is periodically synchronized, by pulses from clock 13 and delay 14, with the pulse sequences produced by the other translators 20; that is, all pulse sequences are periodically restarted together.

In addition, the electrical signal from transducer 1 is also passed through bandpass filter 10 which possesses, typically, a passband ranging from 175 Hz. to 900 Hz. Envelope detector 15, which in the simplest embodiment consists of a halfwave rectifier and a bandpass filter with cutoff frequencies of around 70 and 140 Hz., then produces an output signal with a fundamental frequency equal to that of the envelope of the signal passed by filter 10. Envelope detector 15 can, if desired, be similar to the detector disclosed in my copending patent application Ser. No. 590,582, filed Oct. 29, 1966 and assigned to Bell Telephone Laboratories, assignee of this application.

Period translator 22 operates on the signal from detector 15 to produce a sequence of output pulses with a pulse spacing proportional to the fundamental period of the complex periodic signal being analyzed. This pulse sequence is periodically restarted, by an undelayed pulse from clock 13, a selected time, for example 0.5 millisecond, before the pulse sequences from translator 20 are restarted.

Figure 2:
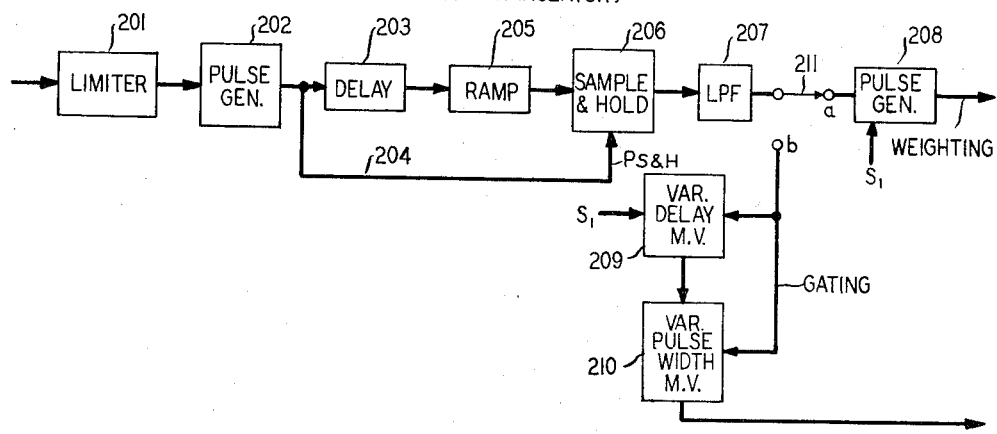
FIG. 2 is a schematic block diagram of period translators 20–1 through 20–N and 22 shown in FIG. 1.

A typical period translator is shown in FIG. 2. This translator is identical not only to translators 20–1 through 20–N in FIG. 1, but also to one embodiment of translator 22 in FIG. 1. By moving switch 211 from contact $a$ to contact $b$ an alternative embodiment of translator 22 is obtained.

Figure 3:
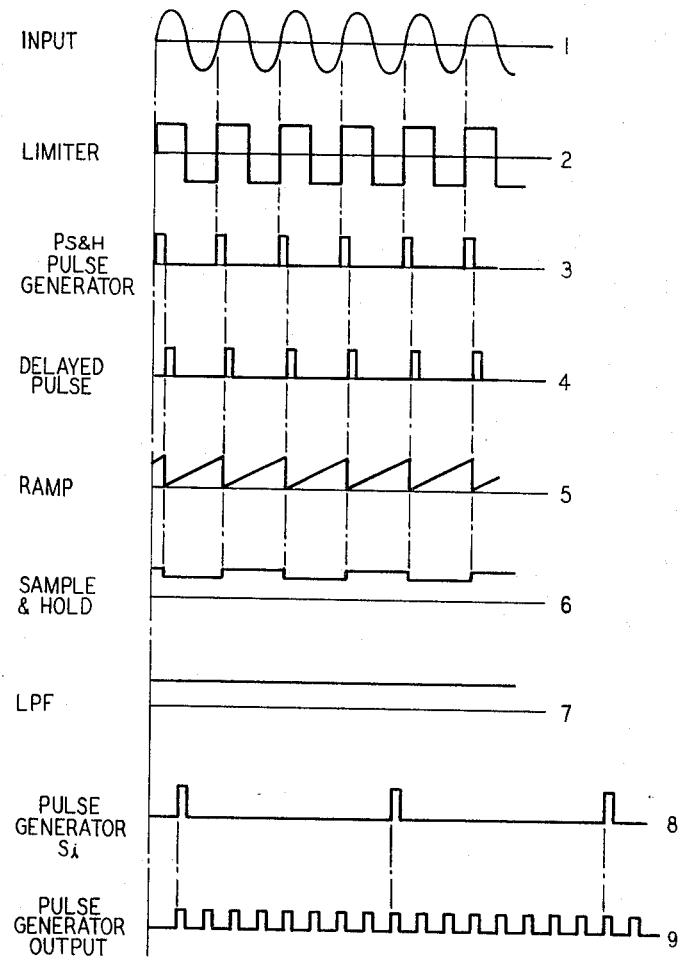
FIG. 3 shows the various signals generated by the components of the period translator shown in FIG. 2.

The input signal to translator 22, shown on the first line of FIG. 3, is converted to a square wave (line 2, FIG. 3) by limiter 201. Pulse generator 202 produces a pulse (line 3, FIG. 3) in response to the leading edge of this square wave. After a brief delay in network 203, each pulse (line 4, FIG. 3) from generator 202 resets to zero, and then restarts, ramp generator 205. Generator 205 produces a linearly increasing output voltage (line 5, FIG. 3) until reset to zero by a new pulse from generator 202. Sample-and-hold circuit 206 samples, in response to an undelayed pulse from generator 202, the voltage from ramp generator 205 just before this voltage is reset to zero by the same pulse, delayed from generator 202. From sample-and-hold circuit 206 is obtained a sequence of constant voltage levels (line 6, FIG. 3), representing the amplitudes of the output voltage from ramp generator 205 at the sampling times. Smoothed by low-pass filter 207 (line 7, FIG. 3), the output voltage from sample-and-hold circuit 206 is used to control the frequency of pulse generator 208. Generator 208, in turn, produces a sequence of output pulses at a frequency inversely proportional to the voltage from filter 207 at the time of a synchronization pulse (line 8, FIG. 3) from clock 13 (FIG. 1), usually delayed by network 14 (FIG. 1).

As shown on line 9 of FIG. 3, the pulses from generator 208 occur at a high rate so that the time necessary to construct a period histogram, and thereby obtain an estimate of the fundamental period, is considerably less than the fundamental period itself. For example, a typical fundamental period is 10 milliseconds, corresponding to a fundamental frequency of 100 Hz. To generate an estimate of the fundamental period in much less than 10 milliseconds, say 2 milliseconds, the spacing between the pulses from generator 208 is made one-fifth what it would be if the estimate was generated in 10 milliseconds.

The pulses from the generator 208 contained in period translator 22 (FIG. 1) are used, as will be explained later, to weight the histogram pulses used to determine the fundamental frequency of the input signal. However, by moving switch 211 from contact $a$ to contact $b$, an alternative form of translator 22 (FIG. 1) is obtained. In this embodiment, variable delay multivibrator 209 (FIG. 3) emits a pulse a controlled time after receiving a pulse from clock 13 (FIG. 1) on the lead labeled $S_1$. The delay between the reception and emission of a pulse by multivibrator 209 is controlled by the voltage from filter 207.

The output pulse from multivibrator 209 triggers multivibrator 210 which, in turn, produces an output pulse whose width is also controlled by the voltage from filter 207. This variable width output pulse is then used to "gate" the histogram pulse of maximum amplitude most likely to represent the fundamental period of the input signal. The use of this gating pulse will be explained in more detail later. Multivibrators suitable for use in this invention are described in chapter 11 of the book by Millman and Taub entitled "Pulse, Digital and Switching Waveforms, Devices and Circuits for Their Generation and Processing" published in 1965 by McGraw-Hill, Inc.

It should be noted that low-pass filter 207, by smoothing the output voltage from sample-and-hold circuit 206, makes possible the use of wider bandwidths in bandpass filters 12–1 through 12–N (FIG. 1) than would otherwise be possible. Thus filters 12 can be wide enough to pass more than one but somewhat less than two harmonics of the input complex periodic signal, because filter 207, with a cutoff frequency beneath the fundamental frequency, will filter out the resulting beat frequency.

The pulse sequences from the translators 20 (FIG. 1) are used to estimate the fundamental period of the complex periodic signal only if the subsignal from which they are derived exceeds a threshold amplitude. Comparison networks 23–1 through 23–N, of well-known design, make this determination. Rectifiers 17–1 through 17–N, together with low-pass filters 19–1 through 19–N, provide estimates of the amplitudes of the subsignals from filters 12–1 through 12–N for use in these comparison networks. These networks then compare these estimates with an estimate of the overall signal amplitude. This estimate of overall signal amplitude, derived from bandpass filter 11, rectifier 16 and low-pass filter 18, is attenuated about 15 db. more or less in resistors 29–1 through 29–N before the comparison. If the subsignal amplitude exceeds the relevant threshold amplitude, the relevant comparison network 23 emits an output signal which opens the corresponding one of AND gates 24–1 through 24–N. Thus, the pulse sequences from the period translators whose input subsignals exceed the selected threshold amplitudes are passed through the corresponding AND gate.

Multipliers 25–1 through 25–N weight the pulse sequences from the corresponding AND gates 24–1 through 24–N by the amplitude of the relevant subsignal. The output signals from multipliers 25 are combined on one input lead, labeled $i$, to transmission gate 26. The resulting composite signal on this input lead represents the so-called "period histogram." Such a histogram is shown in more detail in FIG. 6 on the line labeled "Total."

Figure 6:
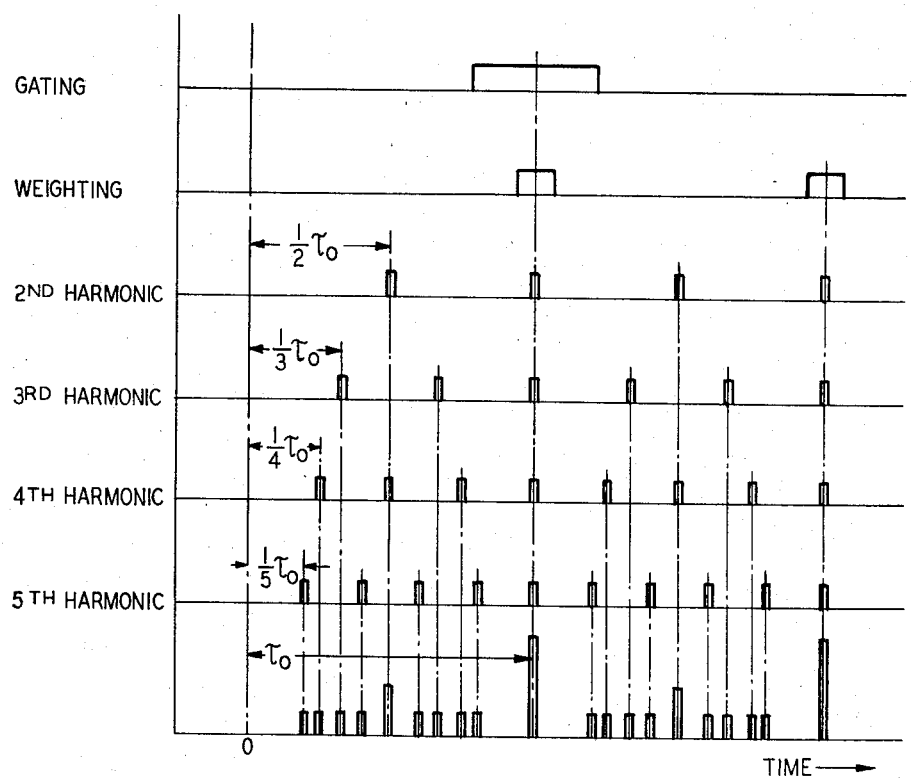
FIG. 6 shows a typical period histogram generated by this invention.

FIG. 6 illustrates schematically the operation of period translators 20–1 through 20–N (FIG. 1). Each sequence of pulses shown in this figure, other than the lines labeled "Gating," "Weighting" and "Total," represents the pulse sequence produced by one of translators 20 (FIG. 1) from a corresponding subsignal of the complex periodic signal being analyzed. While the pulse sequences shown are derived, as labeled, from subsignals containing separately the second through the fifth harmonics, a similar diagram can be constructed for any combination of harmonics.

It is clear from FIG. 6 that the amplitude of each pulse in the series of nonuniform amplitude pulses shown in the row labeled "Total" represents the number of pulses in the pulse sequences from translators 20 and 22 (FIG. 1) simultaneously occurring at the time corresponding to this pulse. The histogram nature of the sum signal on input lead $i$ to transmission gate 26 (FIG. 1) is apparent. FIG. 6 shows the pulses of maximum amplitude in this nonuniform amplitude pulse series to be separated by the fundamental period $\tau_0$ of the complex periodic signal. By speeding up the rate at which translators 20 and 22 (FIG. 1) produce output pulses, the time necessary to estimate the fundamental period is reduced and the pulses shown in FIG. 6 are grouped closely together. This allows several estimates of the fundamental period to be obtained in the real fundamental period and make it possible to follow smoothly changes in fundamental period.

Gate 26 (FIG. 1) transmits the pulse series representing a period histogram in response to the simultaneous presence on input lead $c$ of an output pulse, shown in FIG. 6 on the row labeled "Gating," from period translator 22. Period translator 22, controlled by the output signal from envelope detector 15, in turn, produces a gating pulse, as discussed above, when switch 211 (FIG. 2) is placed on contact $b$.

Alternatively when switch 211 (FIG. 2) is on contact $a$, translator 22 (FIG. 1) produces a sequence of weighting pulses separated by an amount proportional to the fundamental period of the envelope of the complex periodic signal being analyzed. These pulses, shown on the line labeled "Weighting" of FIG. 6, have a duty cycle several times the duty cycles of the pulses from period translators 20-1 through 20-N. Furthermore, these pulses are generated slightly before the pulses from translators 20-1 through 20-N. Delay 14 insures this by delaying the synchronization pulses from clock 13 by a selected amount before transmitting them to translators 20-1 through 20-N. To bypass transmission gate 26 (FIG. 1) in this mode of operation, switches 30 and 31 are each placed on contact $b$ rather than contact $a$. The weighting pulses from translator 22 are then added to the period histogram pulses produced by combining the pulse sequences from translators 20. These weighting pulses make easier the detection of the maximum amplitude histogram pulse corresponding to the fundamental period.

In response to the period histogram transmitted through gate 26, peak detector 27 produces a signal proportional to the fundamental period of the complex signal being analyzed. Period translator 28 converts this signal into a sinusoid at the fundamental frequency.

Figure 4:
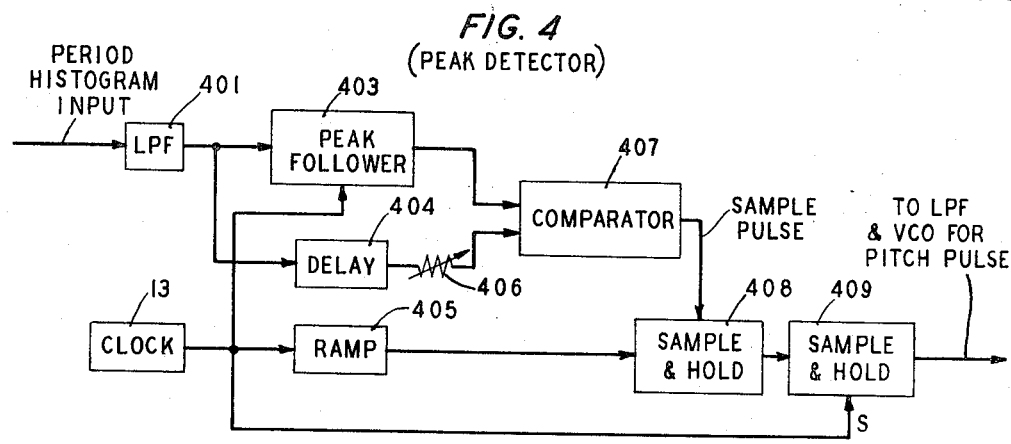
FIG. 4 is a schematic block diagram of peak detector 27 shown in FIG. 1.
Figure 5:
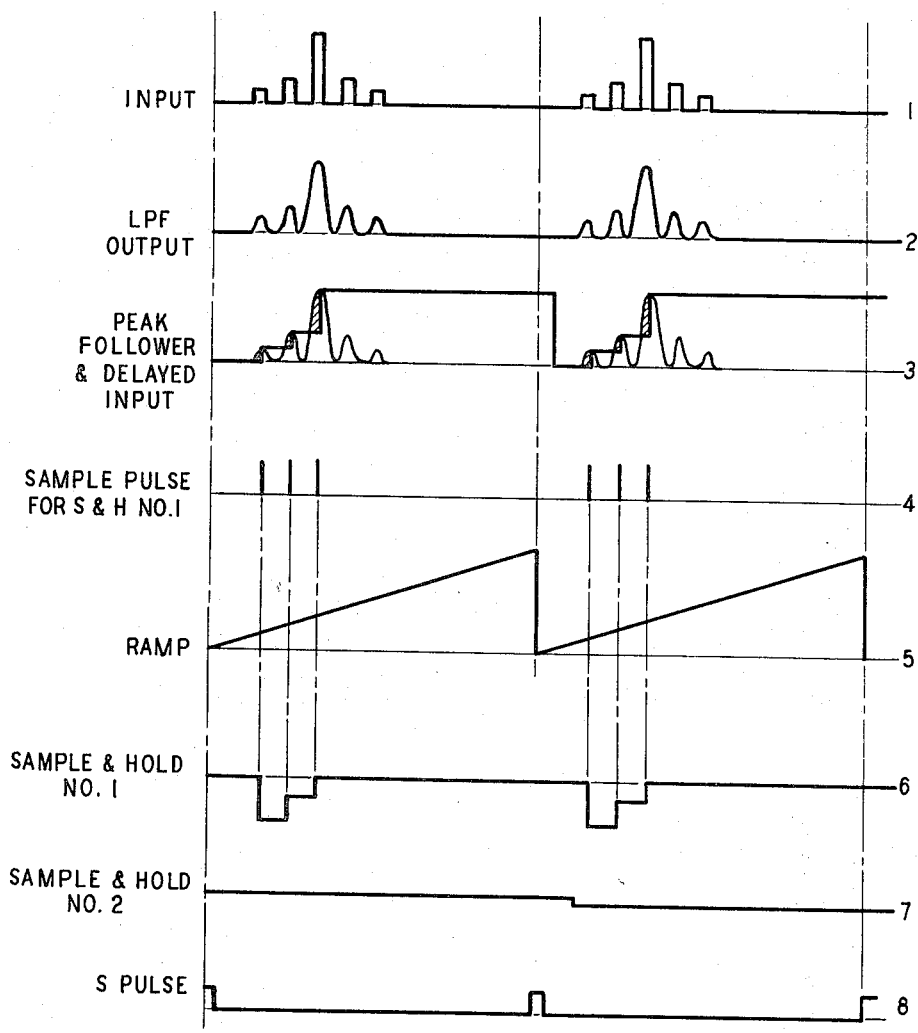
FIG. 5 shows signals produced by the various components of the peak detector shown in FIG. 4.

Peak detector 27 is shown in more detail in FIG. 4. The input signal to detector 27 is, as shown on the first line of FIG. 5, a period histogram. This input signal is passed through low-pass filter 401 and the resulting signal (line 2, FIG. 5) is sent along two paths. Peak follower 403, placed in one path, produces a steady output voltage equal to the maximum amplitude histogram pulse detected. Essentially, as shown on line 3, FIG. 5, follower 403 "follows" the histogram pulses as they increase in amplitude, and holds a voltage proportional to the highest pulse detected. Follower 403 is reset periodically by pulses from clock 13.

In the other path, delay 404 slightly delays the histogram pulses. Variable attenuator 406 allows one to adjust the amplitude of the pulses from delay 404 prior to their entering comparison network 407. Network 407, as shown on line 4, FIG. 5, produces an output pulse whenever a histogram pulse from delay 404 equals the amplitude of the voltage from peak follower 403. It is clear from the waveforms shown on the first four lines of FIG. 5 that the last output pulse from network 407, during one period of the output pulse train from clock 13, occurs at a time proportional to the time of occurrence of the maximum amplitude histogram pulse passed through filter 401.

Each pulse from network 407 activates sample-and-hold circuit 408 to sample, and then hold until the next sample, the output voltage (line 5, FIG. 5) from ramp generator 405. Thus, the output voltage from circuit 408 resembles voltage steps, as shown on line 6 of FIG. 5. Sample-and-hold circuit 409, in turn, samples the output voltage from circuit 408 in response to a synchronization pulse (line 8, FIG. 5) from clock 13. The output voltage from circuit 409 is shown on line 7 of FIG. 5.

The output voltage from peak detector 27 (FIG. 1) generated by sample-and-hold circuit 409 (FIG. 4), is sent to period translator 28 (FIG. 1). Translator 28 low-pass filters this output signal to smooth discontinuities, and then controls the frequency of a voltage controlled oscillator with the smoothed signal. From the voltage controlled oscillator is obtained a pulse train at the fundamental frequency of the input signal. This pulse train can then be used to generate a so-called "pitch signal" in the synthesis of a replica of the input signal, from, for example, coded control signals.

Figure 7:
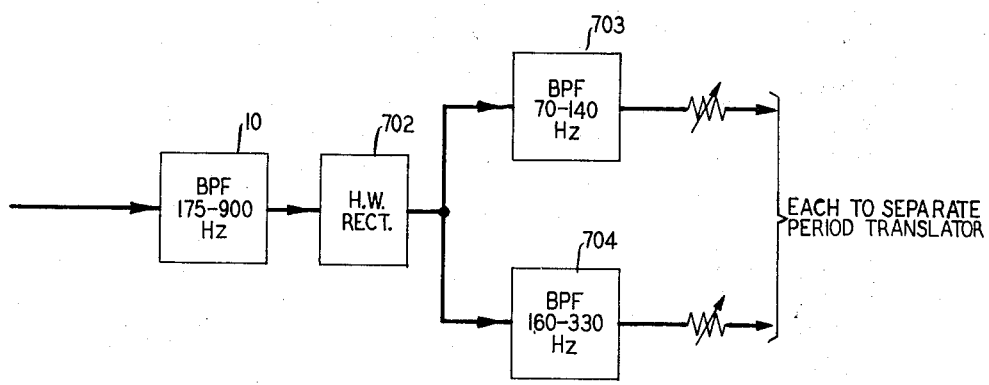
FIG. 7 shows an alternative auxiliary channel for use in the period detector of FIG. 1.

FIG. 7 shows alternative apparatus for insertion between bandpass filter 10 and period translator 22 in FIG. 1. Here, filter 10 is the same as filter 10 in FIG. 1. Half-way rectifier 702 passes only that portion of the output signal from filter 10 of a selected polarity. Bandpass filter 703 has a passband between approximately 70 to 140 Hz., thereby passing the speech envelope of predominantly adult male speakers. Bandpass filter 704, on the other hand, has lower and upper cutoff frequencies of approximately 160 to 330 Hz., respectively, thereby passing the envelope of predominantly women and children. The output signals from filters 703 and/or 704, essentially sinusoids with a frequency roughly equal to the fundamental frequency of the envelope passed by the filters, are then passed to two separate period translators, which replace translator 22, (FIG. 1). Transmission gate 26 is then bypassed, as discussed above, and the output pulses from these two translators are added directly to the output pulses from translators 20-1 through 20-N to produce a weighted period histogram.

FIG. 8 shows a bandwidth compression system using the fundamental frequency detector of this invention. An input signal, typically but not necessarily a speech signal, is detected by transducer 70 and then divided into a plurality of subsignals by bandpass filters 12-1 through 12-N. These filters are identical to the bandpass filters 12-1 through 12-N shown in FIG. 1. The output signals from these filters are used in two ways. First, they are transmitted to the remaining elements of fundamental frequency detector 72. These elements are shown in FIG. 1. The output signal from detector 72 represents, as discussed above in describing FIG. 1, the fundamental period of the complex input signal.

The output signals from filters 12-1 through 12-N are also sent to analyzer 73 where they are used to derive so-called spectrum control signals—low frequency signals with amplitudes proportional to the amplitudes of the subsignals from filters 12. These spectral control signals, and apparatus for their derivation, are both well known in the bandwidth compression arts and thus neither these signals nor the apparatus for deriving them will be discussed in detail.

The output signals from detector 72 and analyzer 73 are then transmitted to synthesizer 74 by means of well-known transmission apparatus—which often includes additional coding and decoding. At synthesizer 74 the spectrum control signals and the fundamental frequency signal are used again in a well-known manner to produce an output signal which resembles the input signal. Because the fundamental frequency detector of this invention yields a high quality estimate of the fundamental frequency of the input signal even when the fundamental frequency is missing or obscured, the replica signal produced by synthesizer 74 is a high quality replica of the input signal.

Other embodiments of this invention will be obvious to those skilled in the signal processing arts in light of this disclosure. While the operation of this invention has been described with respect to a complex periodic speech signal, the principles of this invention can, of course, also be used to determine the fundamental frequency of any complex periodic signal.

What is claimed is:

1. The method of determining the fundamental period of a complex periodic signal which comprises
    determining the period of each harmonic present in the complex periodic signal,
    multiplying each period by a plurality of integers to produce a plurality of product signals associated with each harmonic,
    estimating the fundamental period of the envelope of the complex periodic signal, and
    determining the most frequently occurring product signal common to all harmonics and closest to the period of the envelope of the fundamental frequency, this product signal corresponding to the fundamental period of the complex periodic signal.

2. A bandwidth compression system in which signals representing an input speech signal are transmitted from an analyzer to a synthesizer, said analyzer including
    means for dividing an input speech signal into a plurality of subsignals occupying contiguous frequency bands,
    means for generating spectrum control signals from said plurality of subsignals,
    means for deriving a first measure of the fundamental frequency of said input speech signal directly from said input speech signal,
    means for deriving a second measure of said fundamental frequency from said subsignals, and
    said synthesizer including
    means for synthesizing a replica of said input speech signal from transmitted first and second measures of the fundamental frequency of said input speech signal and from said spectrum control signals.

3. Apparatus as in claim 2 in which said means for deriving includes
    means for producing a plurality of synchronized sequences of pulses as said second measure of fundamental frequency, the spacing of the pulses in each sequence being inversely proportional to the frequency of a corresponding one of said plurality of subsignals,
    means for producing an auxiliary pulse sequence with a pulse spacing inversely proportional to the approximate fundamental frequency of said input speech signal as said first measure of fundamental frequency, said auxiliary pulse sequence being in time relation to said plurality of synchronized sequences of pulses, and wherein said means for synthesizing includes
    means for weighting each of said plurality of synchronized sequences of pulses of said second measure by the amplitude of the subsignal from which it was derived,
    means for combining selected ones of said plurality of weighted, synchronized, sequences of pulses with said auxaliary pulse sequence of said first measure to produce a series of non-uniform amplitude pulses, and
    means for utilizing said series of non-uniform amplitude pulses to produce a period histogram in which the first maximum amplitude pulse represents a measure of the fundamental frequency of said input speech signal.

4. Apparatus as in claim 3 in which said means for combining includes
    means for selecting those pulse sequences from said plurality of synchronized sequences of pulses which are derived from subsignals above corresponding selected amplitudes, and
    means for transmitting, to a summing node, these selected pulse sequences for combination with said auxiliary pulse sequence to produce said series of non-uniform amplitude pulses.

5. Apparatus as in claim 2 in which said means for deriving includes
    means for producing a plurality of synchronized sequences of pulses, the spacing of the pulses in each sequence being inversely proportional to the frequency of a corresponding one of said plurality of subsignals,
    means for producing a gating pulse in time relation to said plurality of synchronized sequences of pulses,
    means for weighting each of said plurality of synchronized sequences of pulses by the amplitude of the subsignal from which it was derived,
    means for combining selected ones of said plurality of weighted, synchronized, sequences of pulses to produce a series of non-uniform amplitude pulses,
    means, responsive to said gating pulse, for passing a selected portion of said series of non-uniform amplitude pulses, and
    means for utilizing a selected one of said pulses in said portion as a measure of the fundamental frequency of said input speech signal.

6. Apparatus as defined in claim 5 wherein,
    said plurality of synchronized sequences of pulses are produced at a rate in excess of the approximate fundamental frequency of said complex periodic signal.

7. Apparatus as in claim 5 in which said means for combining includes
    means for selecting those pulse sequences from said plurality of synchronized sequences of pulses which are derived from subsignals above corresponding selected amplitudes, and
    means for transmitting, to a summing node, these selected pulse sequences for combination to produce said series of non-uniform amplitude pulses.

8. Apparatus for deriving a measure of the fundamental frequency of a complex periodic signal, which includes
    means for dividing said signal into a plurality of subsignals,
    means for producing a plurality of synchronized sequences of pulses, the spacing of the pulses in each sequence being inversely proportional to the frequency of a corresponding one of said plurality of subsignals,
    means for producing an auxiliary pulse sequence with a pulse spacing inversely proportional to the approximate fundamental frequency of said complex periodic signal, said auxiliary pulse sequence being in time relation to said plurality of synchronized sequences of pulses,
    means for weighting each of said plurality of synchronized sequences of pulses by the amplitude of the subsignal from which it was derived,
    means for combining selected ones of said plurality of weighted, synchronized, sequences of pulses with said auxiliary pulse sequence to produce a series of non-uniform amplitude pulses, and
    means for analyzing said series of non-uniform amplitude pulses to produce an indication of the time of occurrence of the first maximum amplitude pulse therein as a measure of the fundamental frequency of said complex periodic signal.

9. Apparatus as defined in claim 8 wherein,
    said plurality of synchronized sequences of pulses are produced at a rate in excess of the approximate fundamental frequency of said complex periodic signal.

10. Apparatus as in claim 8 in which said means for combining includes
  means for selecting those pulse sequences from said plurality of synchronized sequences of pulses which are derived from subsignals above corresponding selected amplitudes, and
  means for transmitting, to a summing node, these selected pulse sequences for combination with said auxiliary pulse sequence to produce said series of non-uniform amplitude pulses.

11. Apparatus for deriving a measure of the fundamental frequency of a complex periodic signal which includes
  means for dividing said signal into a plurality of subsignals,
  means for producing a plurality of synchronized sequences of pulses, the spacing of the pulses in each sequence being inversely proportional to the frequency of the corresponding one of said plurality of said subsignals,
  means for producing from said complex periodic signal a gating pulse, said gating pulse occurring at a time approximately proportional to the fundamental period of said complex periodic signal,
  means for weighting each of said plurality of synchronized sequences of pulses by the amplitude of the subsignal from which it was derived,
  means for combining selected ones of said plurality of weighted, synchronized sequences of pulses to produce a series of non-uniform amplitude pulses,
  means responsive to said gating pulse for passing a selected portion of said series of non-uniform amplitude pulses, and
  means for analyzing said selected portion to determine the time of occurrence of the first maximum amplitude pulse therein, said time serving as a measure of the fundamental frequency of said input speech signal.

12. Apparatus as in claim 11 in which said means for combining includes
  means for selecting those pulse sequences from said plurality of synchronized sequences of pulses, which are derived from subsignals above corresponding selected amplitudes, and
  means for transmitting, to a summing node, these selected pulse sequences for combination to produce said series of non-uniform amplitude pulses.

References Cited

UNITED STATES PATENTS 3,376,386   4/1968   Fant _____ 179—1

KATHLEEN H. CLAFFY, Primary Examiner

C. W. JIRAUCH, Assistant Examiner

U.S. Cl. X.R.

179—15.55; 324—77